United States Patent
Perzov

(10) Patent No.: US 9,621,415 B1
(45) Date of Patent: Apr. 11, 2017

(54) AUTOMATED CONFIGURATION COLLECTION AND MANAGEMENT USING SOURCE CONTROL

(71) Applicant: Symantec Corporation, Mountain View, CA (US)

(72) Inventor: Yury Perzov, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 415 days.

(21) Appl. No.: 14/142,368

(22) Filed: Dec. 27, 2013

(51) Int. Cl.
H04L 29/08 (2006.01)
H04L 12/24 (2006.01)

(52) U.S. Cl.
CPC ................................ H04L 41/0803 (2013.01)

(58) Field of Classification Search
CPC G06Q 10/10; G06F 8/60; H04L 67/34; H04L 67/1095; H04L 69/329
See application file for complete search history.

(56) References Cited

U.S. PATENT DOCUMENTS

| 2009/0276591 | A1* | 11/2009 | Mu | G06F 11/1464 711/162 |
| 2011/0208841 | A1* | 8/2011 | Robertson | G06F 9/44505 709/220 |
| 2015/0074659 | A1* | 3/2015 | Madsen | G06F 8/61 717/177 |

OTHER PUBLICATIONS

ConfigSnapshot, Compare using ConfigSnapshot, available from http://www.configsnapshot.net/configsnapshot_product_compare.html, as early as Nov. 2013.
Dreamfactory, Snapshot, Change & Release Management, available from http://www.dreamfactory.com/download/snapshot_data_sheet.pdf, as early as Nov. 2013.
Sridhar, Snapshot User Guide, available from http://dreamfactory.pbworks.com/w/file/fetch/67675883/SnapShot_User_Guide_July_2013.pdf, Jul. 17, 2013.
BMC Software, Inc., Application Performance Management, available from http://www.bmc.com/products/application-management/application-diagnostics.html, as early as Nov. 2013.
BMC Software, Inc., BMC Application Diagnostics, Quickly solve business-impacting application issues—while ignoring noncritical noise—with deep, end-to-end application diagnostics for all end-user sessions., available from http://documents.bmc.com/products/documents/60/96/276096/276096.pdf, Jul. 2012.

* cited by examiner

*Primary Examiner* — Kim T Nguyen
(74) *Attorney, Agent, or Firm* — Holland & Hart LLP

(57) ABSTRACT

A computer-implemented method for managing enterprise application configurations is described. Configuration information of an enterprise application deployed across multiple servers at a single point in time is collected. An application footprint of the configuration information is generated. The application footprint is stored in a source control format.

20 Claims, 10 Drawing Sheets

AUTOMATED CONFIGURATION COLLECTION AND MANAGEMENT USING SOURCE CONTROL

BACKGROUND

Computer systems have increasingly become an integral part of the business world and the activities of individual consumers. Computer systems may be used to carry out several business, industry, and academic endeavors. The wide-spread use of computers has been accelerated by the increased use of computer networks, including the Internet. Programs that run on computers can be developed for individual use or the use of a group of people. Some computer programs are customized for specific companies and such programs can be used by multiple departments within those companies. Such applications are often referred to as enterprise applications.

Enterprise applications are generally deployed across multiple servers that are used to run programs for a corporation or another type of business. Often, the enterprise applications are loaded to each server separately. Such servers may be dedicated to specific functions and/or use other applications that are not universally shared with the other servers.

Enterprise applications can be used to model a corporation or another type of business. Such applications may be used to solve enterprise wide issues rather than department wide issues. Enterprise applications can reduce redundant programs, improve the enterprise's efficiencies, and can be centrally controlled. Common types of enterprise applications handle functions like order processing, procurement, scheduling, customer management, energy management, accounting, employee management, other types of functions, or combinations thereof.

SUMMARY

According to at least one embodiment, a computer-implemented method for managing enterprise application configurations is described. Configuration information of an enterprise application deployed across multiple servers is collected at a single point in time. An application footprint of the configuration information is generated. The application footprint is stored in a source control format.

In one example, collecting the configuration information includes analyzing an application map file. The application map file may contain server addresses, connection properties, installation directories, configuration file names, and database table names. The application footprint may be automatically generated based on the application map file. In some examples, collecting the configuration information is performed with at least one user extensible plug-in.

In one embodiment, generating the application footprint is performed concurrently with writing the application footprint to the source control format. The application footprint may be a text based representation of the configuration information. In an alternative embodiment, the application footprint is a binary based representation of the configuration information. In such an embodiment, the application footprint includes a cryptographic checksum.

The configuration information may include any appropriate type of information. For example, the configuration information may include, but is not limited to information about servers, devices upon which the enterprise application is installed, hardware addresses, server addresses, database tables, database addresses, configuration files, installed dynamic links library versions, patch versions, connection properties, installation directories, configuration file names, and database table names.

In one configuration, the application footprint is compared to a previously saved footprint of the enterprise application. The application footprint may have a presentation order that is identical to the presentation order of the previously saved footprint. Further, the source control format may be an extensible format. Additionally, the enterprise application may be automatically restored based on a previous configuration setting as part of a process to solving a current issue with the enterprise application where the previous configuration setting was generated at a time when the enterprise application functioned adequately.

A computing device configured to manage enterprise application configurations is also described. The computing device may include a processor and memory in electronic communication with the processor. The device may further include a managing module configured to collect configuration information of an enterprise application deployed across multiple servers at a single point in time, generate an application footprint of the configuration information, and store the application footprint in a source control format. The managing module may be configured to compare the application footprint to a previously saved footprint of the enterprise application. Further, the application footprint may include a presentation order that is the same presentation order of the previously saved footprint. Additionally, the managing module may be configured to automatically restore the enterprise application back to a previous configuration setting in response to solving a current issue with the enterprise application where the previous configuration setting was generated at a time when the enterprise application functioned adequately. Also, the managing module can be configured to automatically generate the application footprint based on the application map file. Collecting the configuration information may be performed with a user extensible plug-in.

A computer-program product for managing enterprise application configurations is also described. The computer-program product may include a computer-readable medium having instructions thereon. The instructions may include code programmed to collect configuration information of an enterprise application deployed across multiple servers at a single point in time, to generate an application footprint of the configuration information, and to store the application footprint in a source control format.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
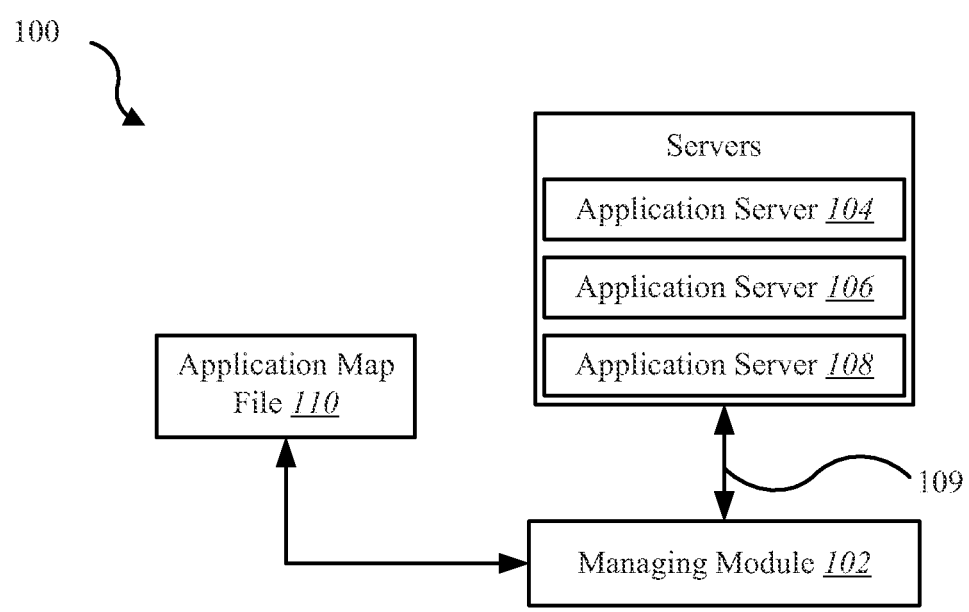
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Each server or other hardware devices that operate the enterprise applications may be configured to run the enterprise application properly. Such configurations may also be compatible with the other applications that are also operated on the server and other hardware devices. If the configurations are incorrect, the one or more of the applications running on the server can operate below its optimal performance.

Often, updating an enterprise application causes the hardware or application configurations to change. Such changes can cause the configurations to be incompatible with another application that is already running on the server. As a result, updates for a first application may render a second application inoperable that is already running on the server.

Due to the different applications on different servers, each server may have different configurations. Further, updating each of the applications on the different servers may cause the configurations on each of the servers to frequently change. Further, technology departments frequently deploy software packages across multiple servers. Within information technology departments, multiple teams are responsible for deploying various system components. Some deployments are automated, while others are done manually. Frequently these deployments are incomplete. Such reasons may include engineer omitted steps, unrecovered errors, incorrectly applied patches, other reasons, or combinations thereof. In multi-server systems, servers and software can be on different patch levels with different configuration parameters that result in system instability. System instability leads to user frustration, perception of reduced quality and potential loss of revenue.

When an application is not working properly, an administrator often checks the configurations to determine if configuration changes have caused the issue. In many cases, a configuration change is a root cause of an application issue. Configuration changes that often cause issues include network switch configuration changes, application configuration changes, server configuration changes, hardware configuration changes, configuration changes in response to applying patches, other types of configuration changes, or combinations thereof.

Manually checking the configurations may help the administrator know whether changes have occurred. However, analyzing the current configuration settings is not always helpful without comparing the configurations setting to the configuration settings of an earlier time or the configuration settings of a similar device or application in a different environment. Such configuration changes can be overlooked when manually scanning the configurations of earlier versions because of the large amount of information. Further, each device may present the configurations in different formats with different names which adds to the difficultly of manually determining when a configuration change is the root cause of an issue.

The issues are even more complicated for enterprise applications because the application is integrated into multiple servers where each server may support different types of functions and programs. In some large scale enterprise application deployments, thousands of changes may be occurring at any given moment that affect the enterprise application. Each server may have a unique set of configurations that are customized to support its particular functions. Thus, if an administrator attempted to resolve the issue by merely changing the configurations of one server, the administrator may inadvertently negatively affect a specific configuration needed to allow a different application or server to operate properly.

The principles described in the present disclosure include a method and system for collecting configuration information of an enterprise application deployed across multiple servers. The collected information is used to generate an application footprint, which can be stored in a source control format. The application footprint may include a status of the current configurations of the enterprise application and the status of the current configurations of the hardware, firmware, and software associated with the application footprint. The application footprint may include a list of patches, operating system configurations, tables, other types of information, and combinations thereof.

A source control format may be any appropriate type of format that tracks and manages changes to files. Such formats may be text based formats, binary based formats, other types of formats, or combinations thereof. Such source control formats may be open source formats, concurrent versioning formats, proprietary formats, extensible formats, other types of formats, or combinations thereof. The extensible formats may include an ability to accommodate future growth of the application footprint, such as the addition of future configuration settings taken at a future time. An example of an extensible format includes formats written in extensible markup language (XML).

The source control format allows the application footprint to be compared easily to previously saved footprints. The presentation order of the current application footprint and the previously saved footprint can be the same so the administrator can easily spot the differences between the two versions. As a result, the administrator can quickly determine which differences between the versions are potentially the root cause of the issue. Such presentation orders may be organized alphabetically, by date, by category, by network layer, with a different type of order, or combinations thereof.

The principles described in the present disclosure also include examples where the configuration information is automatically collected in response to discovering an issue. The current application footprint is generated and compared to a previously saved footprint taken at a time when the enterprise application worked properly. In some examples, the system automatically restores the enterprise application to the configuration settings of the previously saved footprint so that the enterprise application can work. An automatic email or another type of message may be sent to the administrator indicating the details about the restoration.

The principles described in the current disclosure do not limit when an application footprint may be generated. For example, an application footprint may be generated in response to discovering an issue. In other instances, the application footprint may be generated prior to applying a patch to at least a portion of the enterprise application or associated hardware, firmware, or software. In yet other examples, the application footprints can be generated on a periodic basis. The principles described in the present disclosure include other trigger events or factors that may be used to determine when to create an application footprint.

FIG. 1 is a block diagram illustrating one embodiment of an environment 100 in which the present systems and methods may be implemented. In one embodiment, a managing module 102 may communicate with multiple servers 104, 106, 108 across a first network connection 109. The first network connection 109 may be a local area network (LAN), an enterprise network, a wireless network, another type of network, or combinations thereof. The managing module may include the hardware and programmed instructions necessarily to carry out the functions of the managing module. The managing module 102 is also in communication with an application map file 110.

The managing module 102 may communicate with the servers 104, 106, 108 to record the current configuration settings of the enterprise application. In this example, the enterprise application is loaded to each of the servers 104, 106, 108. Thus, when the managing module 102 determines to collect configuration settings about the enterprise application, the managing module 102 may collect configuration data from each of the servers 104, 106, 108. If the enterprise application were loaded to additional servers, the managing module 102 may communicate with each of the additional servers as well. The configuration information collected by the managing module 102 may include any appropriate type of configuration information, such as server names, server addresses, server versions, operating system types and versions, application versions, patch versions, other type of information, or combinations thereof.

The enterprise application's installation may be represented in the application map file 110. The application map file 110 may include, but is not limited to, server addresses, connection properties, server specific component installation directories, other types of installation directories, names of configuration files, and database table names containing configuration information. In this embodiment, the application map file 110 is implemented using XML, which allows for easy extensibility. The application map file 110 may include information that is redundant to the information that can be obtained directly from the servers 104, 106, 108. In some examples, the application map file 110 may include additional information that is not accessible through the servers 104, 106, 108.

The application map file 110 may be stored in an application map file repository. In some instances, the application map file 110 is stored on one of the servers 104, 106, 108. The application map file 110 may be stored in any appropriate location within or outside of an enterprise network.

In some examples, the managing module 102 collects the configuration data from the application map file 110 while receiving issue reports from the application servers. In response to discovering an issue from one of the servers 104, 106, 108, the managing module 102 collects the configuration data from the application map file 110.

The managing module 102 generates an application footprint in response to obtaining the configuration information. The application footprint may be used to determine a root cause of an issue. In other examples, the application footprint is merely stored in a source control format to be available for future comparisons with additional footprints taken at a future time.

The managing module 102 may be incorporated into one of the servers 104, 106, 108 or another appropriate device. In some examples, the managing module 102 manages each enterprise application throughout the enterprise. In other examples, the managing module 102 is dedicated to a single or selective number of enterprise applications.

In some embodiments, the managing module 102 collects information from the servers 104, 106, 108 to update the application map file 110. In such an embodiment, the managing module 102 may periodically request configuration settings of the enterprise application to keep the application map file 110 up-to-date. When one of the servers 104, 106, 108 notifies the managing module 102 of an issue, the managing module 102 may retrieve the configuration data from the application map file. In other embodiments, a separate update module (not shown) actively updates the application map file 110, and the managing module 102 retrieves the configuration information when troubleshooting an issue.

Figure 2:
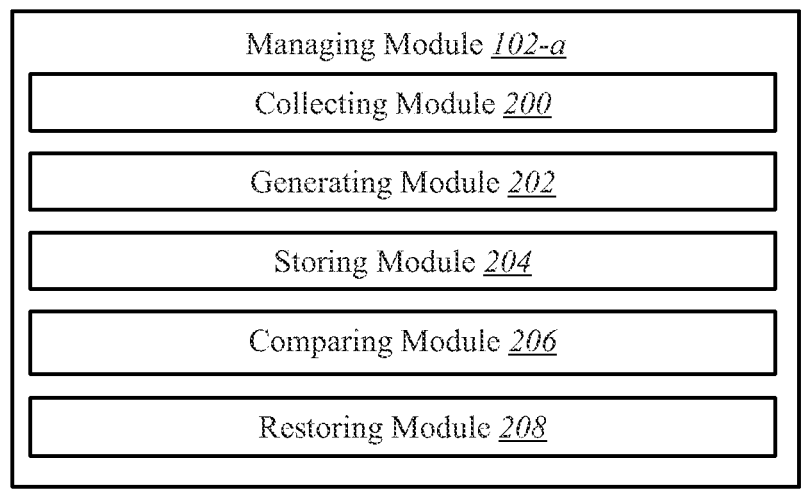
FIG. 2 is a block diagram illustrating one embodiment of a managing module that may be implemented with the present systems and methods.

FIG. 2 is a block diagram illustrating one embodiment of a managing module 102-a that may be implemented with the present systems and methods. The managing module 102-a may be an example of the managing module 102 of FIG. 1. In one configuration, the managing module 102-a includes a collecting module 200, a generating module 202, a storing module 204, a comparing module 206, and a restoring module 208. Each of the modules 102-a, 200, 202, 204, 206, 208 may include the appropriate combination of hardware and software necessary to carry out the module's designated function.

The collecting module 200 may actively retrieve configuration information in response to an appropriate trigger event. Such an event may include receiving a message that there is an issue that may involve configuration settings. An example of another type of event may be exceeding a predetermined time threshold since a previous collection of configuration information. While the above examples have been described with reference to specific types of events that can cause the collecting module 200 to actively retrieve configuration data, any appropriate type of event may be used in accordance with the principles described in the present disclosure. In other examples, the collecting module 200 may passively receive information from any appropriate source that has configuration information.

The generating module 202 may generate an application footprint based on the configuration information gathered. The application footprint may include a textual representation of the configuration information, a binary representation of the configuration information, another type of representation, or combinations thereof. The application footprint may be formatted in an extensible format, a control source format, another type of format, or combinations thereof. In some examples, the generating module 202 makes multiple representations in different formats or different presentation orders in circumstances when one format or presentation provides advantages over the other.

The storing module 204 may store the application footprint in a source control format that is available for comparison to other footprints. For example, the application footprint may be stored such that the application footprint can be compared to previously saved footprints, footprints that will be generated in the future, footprints taken of different enterprise applications, footprints of the enterprise application in a different environment, other types of footprints, or combinations thereof. The storing module 204 may include a control source database of previously taken footprints and a source control.

The comparing module 206 may compare the current application footprint with the previously saved footprints. The comparing module 206 may have the ability to determine the differences between the current footprint and the previously saved footprint. In some examples, the current application footprint and the previously saved footprint are organized in the same presentation order so that the configuration information in both footprints is listed in the same order. This similar organization allows the comparing module 206 to easily identify dissimilarities between the footprints.

In some situations, the comparing module 206 compares the current application footprint with multiple previously saved footprints. In this manner, the comparing module 206 can understand a configuration history of the enterprise application.

In alternative examples, the comparing module 206 compares the current application footprint against different applications. In certain situations, the comparing module 206 can discover useful information by comparing an adequately working enterprise application against a different enterprise application that has an issue.

The comparing module 206 may generate a report to assist an administrator in finding the differences. Such a report may include highlighting the differences between the configurations of the current application footprint and the previously saved footprint. In other examples, the report may include just a list of the configurations that are different. In yet other examples, the comparing module 206 may provide an explanation about the role of each configuration that is different and explain how it is likely affecting the enterprise application.

Further, the comparing module 206 may draw conclusions about the root cause of the issue with the enterprise application based on the comparison. In such an example, the comparing module 206 may initiate remedial action to resolve the issue. For example, the comparing module 206 may cause that a specific configuration be undone or changed to allow the enterprise application to work properly again.

Such conclusions may be made based on the time that a previously saved footprint was generated. For example, if a record indicates to the comparing module 206 that the enterprise application worked properly at the time that the previously saved footprint was generated, the comparing module 206 may conclude that at least one of the differences between the current application footprint and the previously saved footprint is a cause of the issue. If there are just a few differences between the current application footprint and a previously saved footprint that represents a time when the enterprise application worked properly, then the comparing module 206 can narrow in on the just a few differences to determine the cause for why the enterprise application is not working properly. On the other hand, if there are numerous differences, the comparing module 206 may have to filter out those differences that are not likely to affect the issue causing the enterprise application from working as desired.

The comparing module 206 may be in communication with the restoring module 208. The restoring module 208 may restore the enterprise application to have configuration settings of a previous time. In some examples, the configuration settings that the restoring module 208 uses are based on the previously saved footprint used by the comparing module 206. In such an example, the entire enterprise application is restored to a previous configuration setting. In other examples, the restoring module 208 restores just a portion of the configurations back to a previous configuration setting. The restoring module 208 may test the enterprise application after restoring the configuration settings to determine if the issue was resolved. If the issue was not resolved, the restoring module 208 may restore the enterprise application back to yet a different configuration setting.

Figure 3:
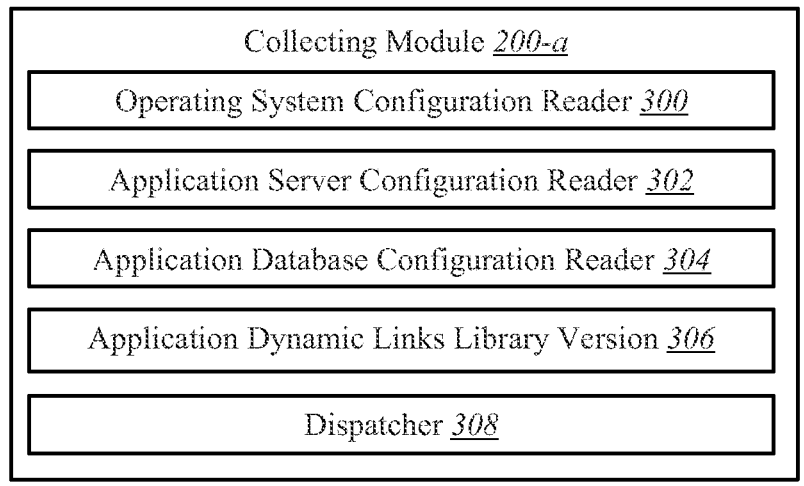
FIG. 3 is a block diagram illustrating one embodiment of a collecting module that may be implemented with the present systems and methods.

FIG. 3 is a block diagram illustrating one embodiment of a collecting module 200-a that may be implemented with the present systems and methods. The collecting module 200-a may be an example of the collecting module 200 illustrated in FIG. 2. In this example, the collecting module 200-a may include multiple plug-ins that may collect different types of configuration information. The collecting module 200-a may include an operating system configuration reader 300, an application server configuration reader 302, an application database configuration reader 304, an application dynamic links library version 306, and a dispatcher 308. The dispatcher 308 invokes individual application configuration readers 300, 302, 304, 306 based on the contents of the application map file 110. The configuration readers 300, 302, 304, 306 may generate a human readable application footprint. The collecting module 200-a then submits the application footprint to the storing module 204.

Figure 4:
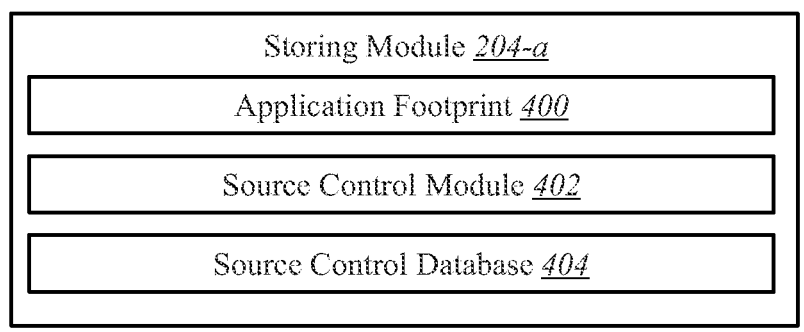
FIG. 4 is a block diagram illustrating one example of a storing module that may be implemented with the present systems and methods.

FIG. 4 is a block diagram illustrating one example of a storing module 204-a that may be implemented with the present systems and methods. The storing module 204-a may be an example of the storing module 204 illustrated in FIG. 2. In this example, the storing module 204-a may include an application footprint 400, a source control module 402, and a source control database 404.

The application footprint 400 may be received at the storing module 204 from the generating module 202 in response to generating the application footprint 400. The application footprint 400 may be stored in a temporary memory, such as a cache or a buffer when received by the storing module 204. The source control module 402 may convert the application footprint 400 into a control source format if the application footprint is not already stored in an extensible format. The converted application footprints are stored in the control source database for future retrieval.

Figure 5:
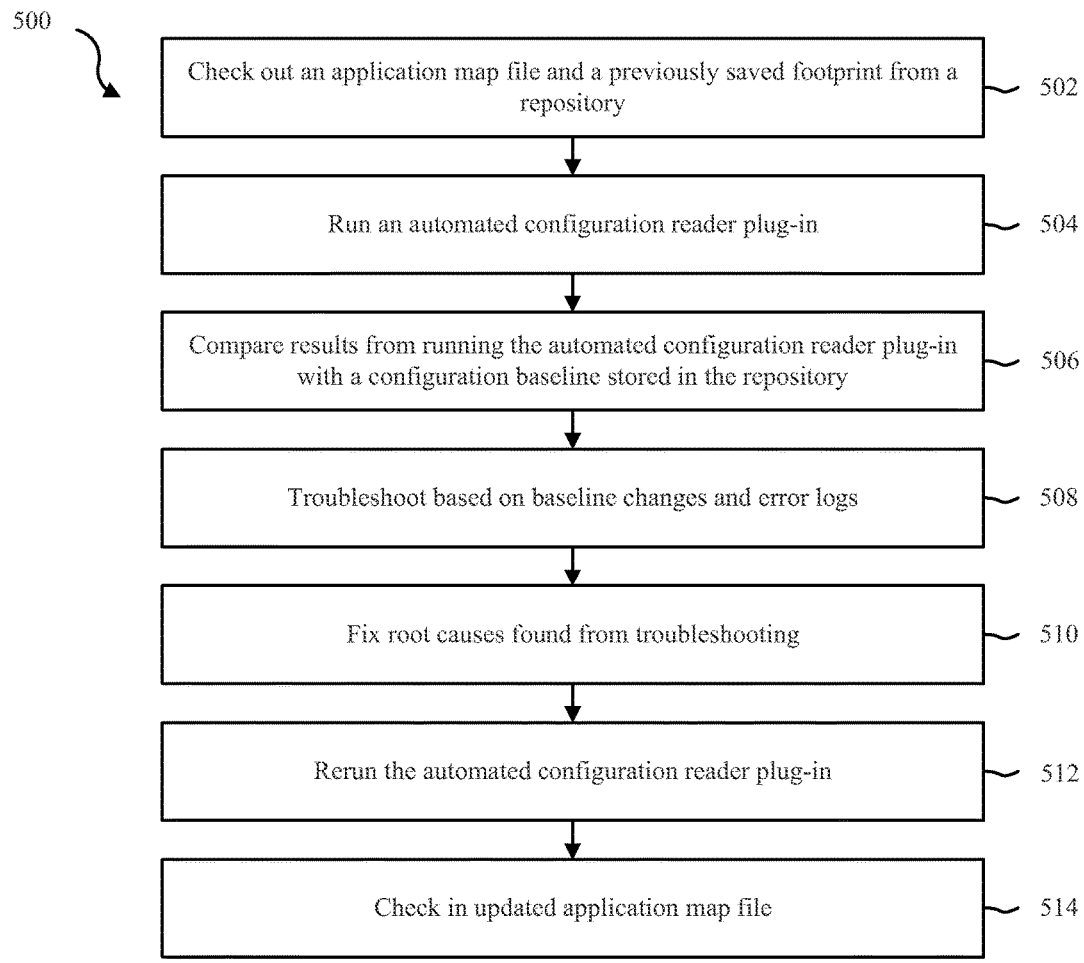
FIG. 5 is a flow diagram illustrating one embodiment of a method for updating an enterprise application that may be implemented with the present systems and methods.

FIG. 5 is a flow diagram illustrating one embodiment of a method 500 for updating an enterprise application that may be implemented with the present systems and methods. In one configuration, the method 500 may be implemented with a managing module 102, such as the managing module 102 of FIGS. 1 and/or 2. The method 500 may include checking out 502 an application map file and a previously saved footprint from a repository and running 504 at least one automated configuration reader plug-in to extract data from the application map file and the previously saved footprint.

The application footprint may be incomplete in circumstances when the collecting module fails to collect information from each of the appropriate sources of configuration information. Further, the application map file may be incomplete when new hardware is added to the network, when additional servers are deployed, or when new software programs are installed. The method 500 may be used to update the application map files.

The results from running the automated configuration readers are compared 506 with a configuration baseline stored in the repository. The method 500 further includes troubleshooting 508 based on the changes and error logs discovered during the comparison to discover issues. The root causes of the issues are fixed 510 and the automated configuration reader plug-ins are rerun 512 on the footprint and the application map file. If the automated configuration reader plug-ins fail to discover additional changes or error logs, the updated application map file is checked 514 back into the repository.

Figure 6:
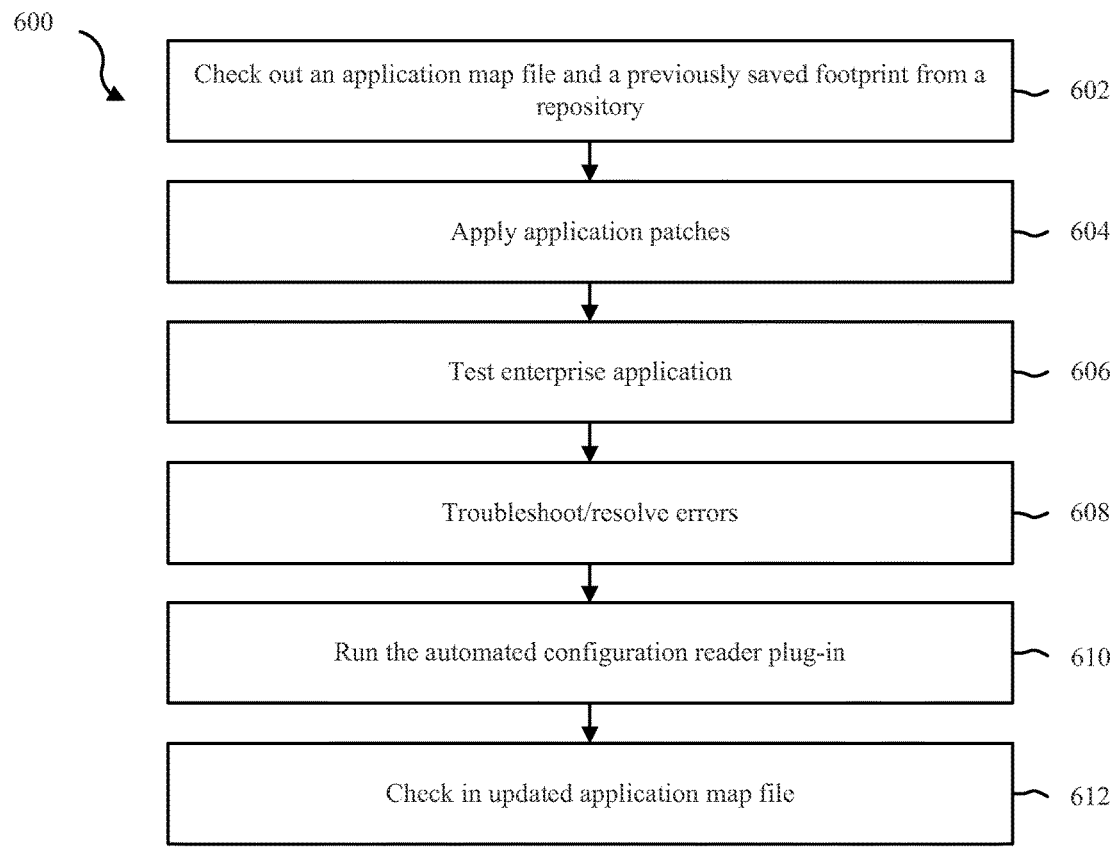
FIG. 6 is a flow diagram illustrating one embodiment of a method for resolving an issue in an enterprise application that may be implemented with the present systems and methods.

FIG. 6 is a flow diagram illustrating one embodiment of a method 600 for resolving an issue in an enterprise application that may be implemented with the present systems and methods. In this example, the method 600 includes an administrator checking 602 out an application map file and a previously saved footprint from the source control database. The administrator may run the automated configuration reader plug-ins against the managed application to capture updated configuration information. The administrator may determine configuration changes by comparing the captured updated managed configuration to a previously saved footprint stored in source control database. The administrator may troubleshoot based on changes from last known configurations and any error logs. The administrator may fix any issues found. Fixing issues my involve applying new patches 604, applying missing patches, rolling back patches, or altering application configurations. The administrator may then test 606 the enterprise application and trouble shoot 608 any issues. Next, the administrator may run 610 the automated configuration reader plug-in again to capture any changes introduced as part of resolving the issues. Lastly, the administrator checks in 612 the updated application map file.

Figure 7:
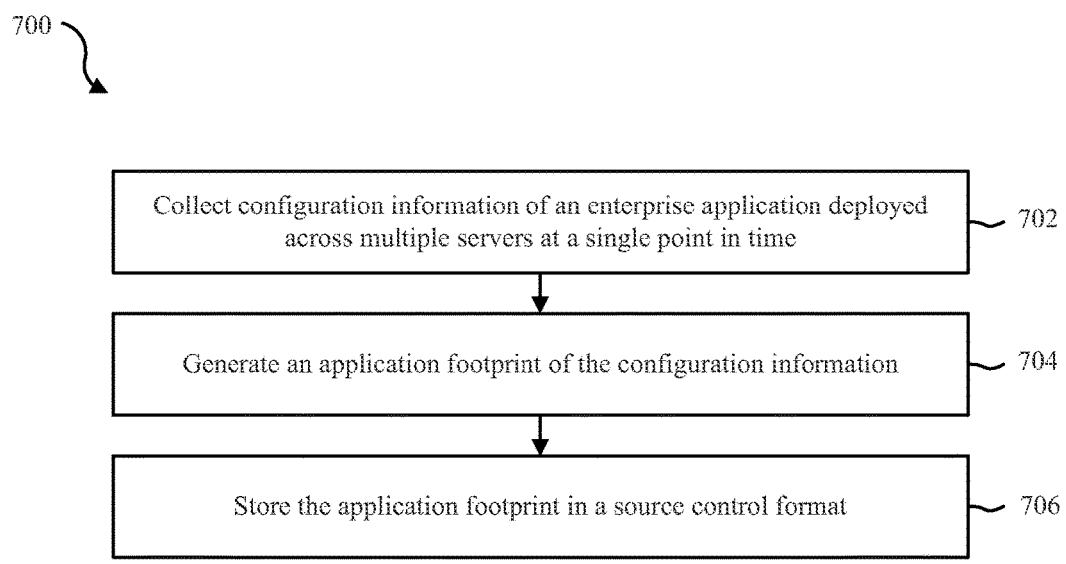
FIG. 7 is a flow diagram illustrating one embodiment of a method for managing configuration information that may be implemented with the present systems and methods.

FIG. 7 is a flow diagram illustrating one embodiment of a method 700 for managing configuration information that may be implemented with the present systems and methods. In this example, the method 700 includes collecting 702 configuration information of an enterprise application deployed across multiple servers at a single point in time, generating 704 an application footprint of the configuration information, and storing 706 the application footprint in a source control format.

Collecting the configuration information may be accomplished through any appropriate mechanism. In some examples, XML plug-ins are used to collect information from operating systems, servers, applications, libraries, other types of repositories, application map files, other configuration information sources, or combinations thereof. The collecting module may collect configuration information from every layer of the network. For example, the collecting module may collect configuration information from the physical layer, the data link layer, the network layer, the transport layer, the session layer, the presentation layer, and the application layer. By collecting configuration information from each of the layers of the network, the collecting module gathers a complete picture of all of the configurations that can affect the performance of the enterprise application.

Generating the application footprint may be accomplished through any appropriate mechanism as well. For example, the application footprint may be generated to have a consistent presentation order as with previously saved footprints. The application footprints may include text that represents the configuration information, binary data that represents the configuration information, symbols that represent the configuration information, other formats that represent configuration information, or combinations thereof. In some examples, generating the application footprint is performed concurrently with writing the application footprint into a source control format.

Storing the application footprint may be in a control source database. The control source database may be searchable such that the comparing module can look-up previously saved footprints to assist in resolving current issues with the enterprise application.

The principles described in the current disclosure include a system that collects, stores, and facilitates analysis of an application's configuration information. The system can take as an input an application map file. Based on the application map file, a dispatcher component invokes various application configuration reader plug-ins that generate a text representation, or another type of representation of the application configuration. For purposes of this disclosure, the representation is referred to as a footprint. The system then submits the representation of the enterprise application's configurations to a source control module. System administrators can then use built in functionality of the source control module to audit, compare, and track application configurations across application servers or installations.

Figure 8:
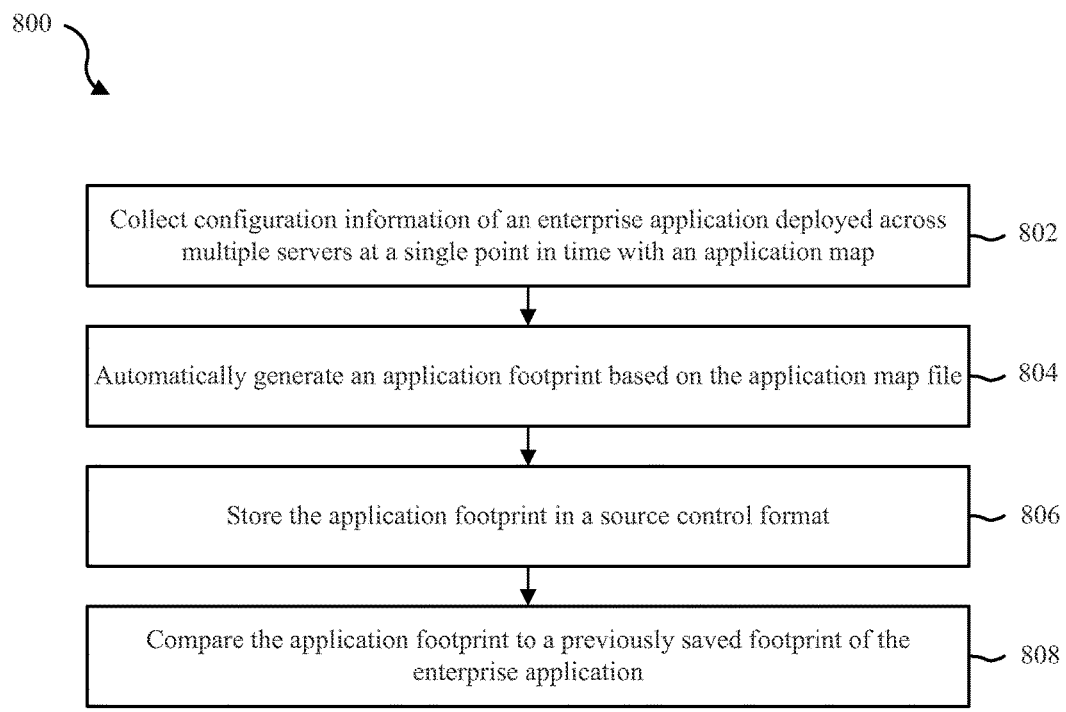
FIG. 8 is a flow diagram illustrating one embodiment of a method for managing configuration information that may be implemented with the present systems and methods.

FIG. 8 is a flow diagram illustrating one embodiment of a method 800 for managing configuration information that may be implemented with the present systems and methods. In this example, the method 800 includes collecting 802 configuration information of an enterprise application deployed across multiple servers at a single point in time, generating 804 an application footprint of the configuration information, storing 806 the application footprint in a source control format, and comparing 808 the application footprint to a previously saved footprint of the enterprise application.

Comparing the application footprint to a previously saved footprint may occur when the enterprise application is experiencing an issue that prevents the enterprise application from performing at its highest performance, whenever desired by an administrator, or in response to the occurrence of an event that triggers the comparison. A comparing module may receive input from the managing module to look up a previously saved footprint from a time when the enterprise application worked at its best or at some other level of performance. The comparing module may find such a previously saved footprint through trial and error, through a log that indicates when the enterprise application functioned at the desired level, or through another type of mechanism. Once found, the comparing module may determine the differences between the previously saved footprint and the current application footprint. The comparing module may notify an administrator of the changes or the comparing module may cause another module, such as the restoring module, to resolve the issues based on the comparing module's findings.

The comparing module may discover the differences between the current application footprint and the previously saved footprint through any appropriate mechanism. For example, if the footprints are in a text representation format, a binary representation format, or another type of format, then the comparing module may look for differences between the formats. In some examples where the footprints are in a binary representation format, the comparing module may use a cryptographic checksum to determine differences between the current application footprint and the previously saved footprint. The cryptographic checksum may determine a value for each footprint (or a portion of the footprints) based on a checksum algorithm. If the values for the footprints are different, then comparing module can determine that there are differences between the footprints.

Figure 9:
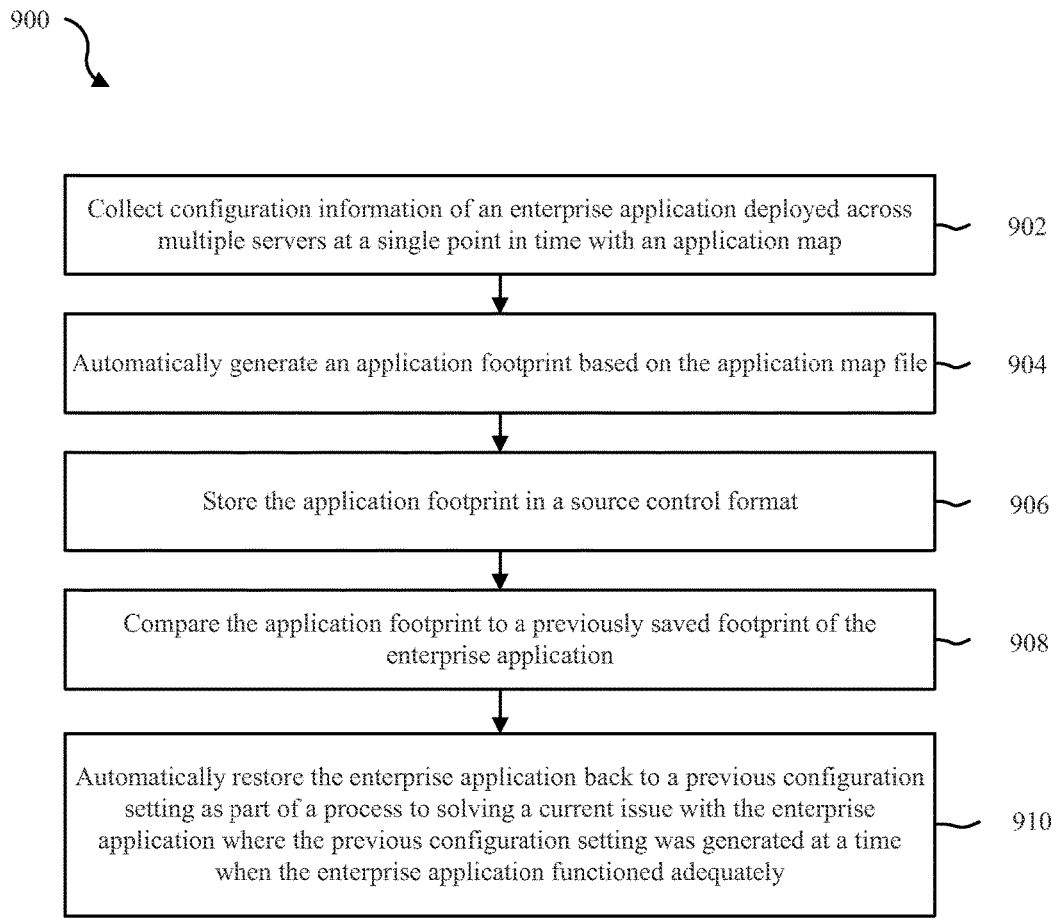
FIG. 9 is a flow diagram illustrating one embodiment of a method for managing configuration information that may be implemented with the present systems and methods.

FIG. 9 is a flow diagram illustrating one embodiment of a method 900 for managing configuration information that may be implemented with the present systems and methods. In this example, the method 900 includes collecting 902 configuration information of an enterprise application deployed across multiple servers at a single point in time, automatically generating 904 an application footprint of the configuration information, storing 906 the application footprint in a source control format, comparing 908 the application footprint to a previously saved footprint of the enterprise application, and automatically restoring 910 the enterprise application back to a previous configuration setting as part of a process to solving a current issue with the enterprise application where the previous configuration setting was generated at a time when the enterprise application functioned adequately.

Restoring the enterprise application to a previous application setting may include restoring the configurations to the entire enterprise application across all of the servers. In some examples, the restoring module may send a message to an administrator indicating the changes made.

Figure 10:
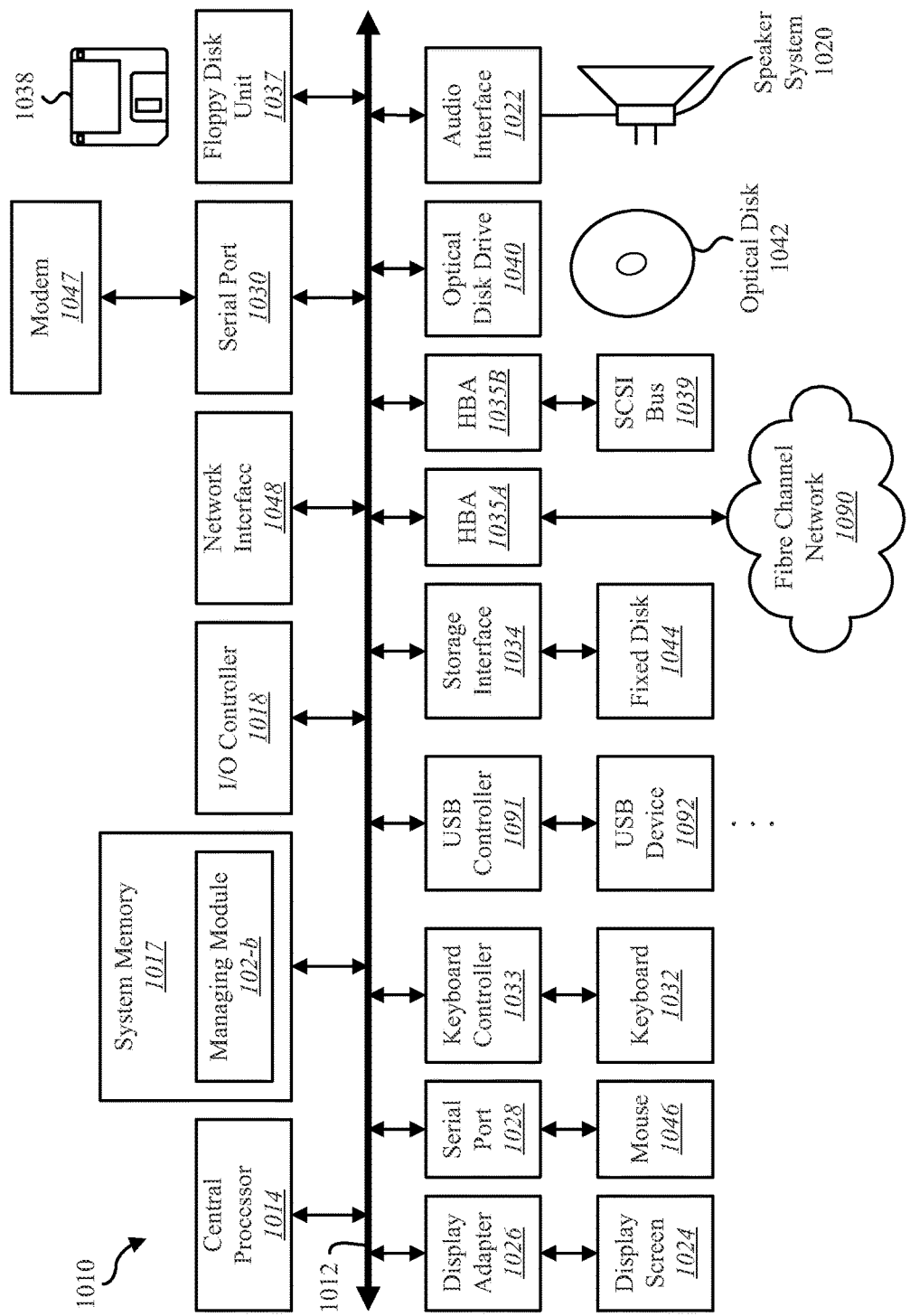
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a managing module 102-b to implement the present systems and methods may be stored within the system memory 1017. The managing module 102-b may be an example of the managing module 102 illustrated in FIGS. 1 and/or 2. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connections using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
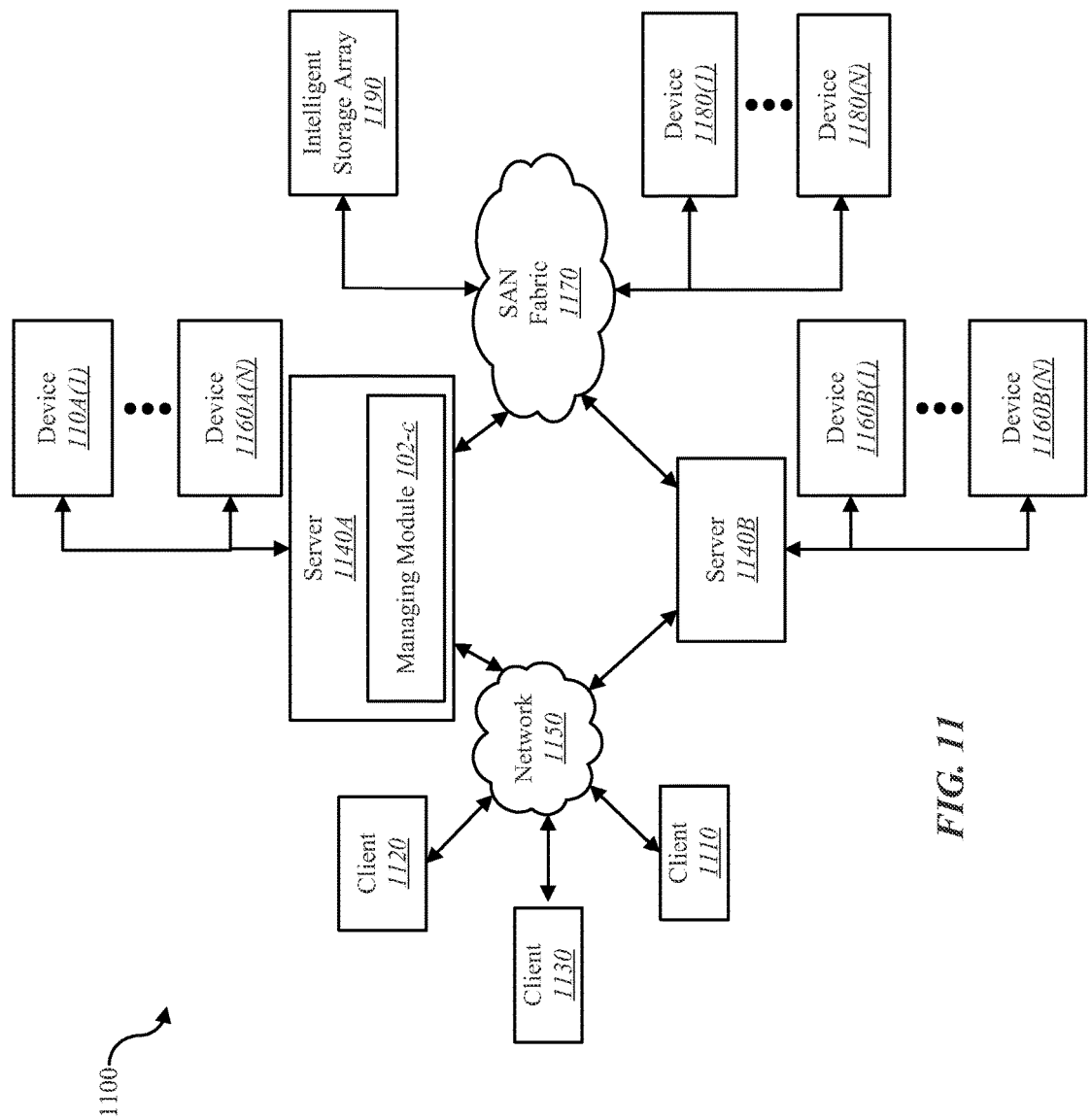
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1110, 1120 and 1130, as well as storage servers 1140A and 1140B (any of which can be implemented using computer system 1110), are coupled to a network 1150. In one embodiment, a managing module 102-c may be located within a server 1140A, 1140B to implement the present systems and methods. The managing module 102-c may be an example of the managing module 102 illustrated in FIGS. 1, 2, and/or 10. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing enterprise application configurations, comprising:
    collecting, by a processor, configuration information of an enterprise application deployed across multiple servers at a single point in time;
    generating, by the processor, an application footprint of the configuration information;
    storing, by the processor, the application footprint in a source control format on a non-transitory computer-readable medium; and
    transmitting, by the processor, a notification based at least in part on generating the application footprint to an electronic device associated with an administrator.

2. The method of claim 1, further comprising:
    comparing the application footprint to a previously saved footprint of the enterprise application.

3. The method of claim 2, wherein the application footprint comprises a presentation order that is identical to the presentation order of the previously saved footprint.

4. The method of claim 1, wherein the application footprint is a text based representation of the configuration information.

5. The method of claim 1, wherein the application footprint is a binary based representation of the configuration information.

6. The method of claim 1, wherein the source control format is an extensible format.

7. The method of claim 1, further comprising:
    automatically restoring the enterprise application back to a previous configuration setting as part of a process to solving a current issue with the enterprise application where the previous configuration setting was generated when the enterprise application functioned adequately.

8. The method of claim 1, wherein collecting the configuration information includes analyzing an application map file.

9. The method of claim 8, further comprising:
    automatically generating the application footprint based on the application map file.

10. The method of claim 8, wherein the application map file contains server addresses, connection properties, installation directories, configuration file names, and database table names.

11. The method of claim 1, wherein collecting the configuration information is performed with a user extensible plug-in.

12. The method of claim 1, wherein the application footprint further comprises a cryptographic checksum.

13. The method of claim 1, wherein generating the application footprint is performed concurrently with writing the application footprint to the source control format.

14. A computing device configured to manage enterprise application configurations, comprising:
- a processor;
- memory in electronic communication with the processor; and
- instructions stored in the memory, the instructions being executable by the processor to:
  - collect configuration information of an enterprise application deployed across multiple servers at a single point in time;
  - generate an application footprint of the configuration information;
  - store the application footprint in a source control format.

15. The computing device of claim 14, wherein the instructions are further executable by the processor to:
- compare the application footprint to a previously saved footprint of the enterprise application.

16. The computing device of claim 15, wherein the application footprint comprises a presentation order that is identical to the presentation order of the previously saved footprint.

17. The computing device of claim 14, wherein the instructions are further executable by the processor to:
- automatically restore the enterprise application back to a previous configuration setting in response to solving a current issue with the enterprise application where the previous configuration setting was generated when the enterprise application functioned adequately.

18. The computing device of claim 14, wherein the instructions are further executable by the processor to:
- automatically generate the application footprint based on an application map file.

19. The computing device of claim 14, wherein collecting the configuration information is performed with a user extensible plug-in.

20. A computer-program product for managing enterprise application configurations, the computer-program product comprising a non-transitory computer-readable medium having instructions thereon, the instructions being executable by a processor to:
- collect configuration information of an enterprise application deployed across multiple servers at a single point in time;
- generate an application footprint of the configuration information; and
- store the application footprint in a source control format.

* * * * *